Dec. 17, 1968 I. KAUFMAN 3,417,317

MICROWAVE HARMONIC GENERATOR AND MIXER WITH IDLING CIRCUIT

Filed Nov. 3, 1966

Irving Kaufman,
INVENTOR.
BY.
Edward Dugas
AGENT.

United States Patent Office 3,417,317

Patented Dec. 17, 1968

3,417,317

MICROWAVE HARMONIC GENERATOR AND MIXER WITH IDLING CIRCUIT

Irving Kaufman, Tempe, Ariz., assignor to TRW Inc., Redondo Beach, Calif., a corporation of Ohio Filed Nov. 3, 1966, Ser. No. 591,855
4 Claims. (Cl. 321—69)

ABSTRACT OF THE DISCLOSURE

A microwave harmonic generator and frequency mixer. A nonlinear reactance element such as a diode is used in combination with a resonant cavity for doubling the frequency of a local oscillator wave. This doubled local oscillator wave is mixed or heterodyned with an input signal at a higher frequency to obtain the frequency sum or difference. The resonant cavity is an idling circuit solely tuned to twice the frequency of the oscillatory wave. This device will operate at ultramicrowaves of the order of 100 gHz.

This invention relates to a harmonic mixer, and more particularly to a harmonic mixer which utilizes an idling circuit and a non-linear reactance to effectively increase the frequency of a local oscillator while at the same time providing a mixing action.

Microwave transmission in the 100 gc. carrier frequency range requires a local oscillator with a comparable frequency output. For example, the mixer serves to beat oscillations of two different frequencies from different sources to produce an output of a third frequency which may be the sum or difference of the two frequencies. At these higher frequencies, it becomes difficult to supply local oscillator power, especially when a harmonic generator utilizing multipliers is used.

Semiconductor oscillators, which are most desirable because of their small size and weight, presently cannot reach this frequency range. Harmonic multipliers have been used to increase the frequency available from these oscillators. One such device is disclosed in applicant's U.S. Patent No. 3,165,690, entitled, "Harmonic Generator Utilizing a nonlinear reactance," which is assigned to TRW Inc., the assignee of the present invention. In operation, the device of the aforementioned patent provides at least a second resonant circuit path for harmonic currents which appear across the reactance element. This second circuit path is called an "idler circuit" because it provides a low impedance circulating path for a desired harmonic current. This harmonic current is mixed with the fundamental current to provide a composite current at a frequency equal to the algebraic sum of the fundamental and harmonic frequencies.

In the device of this invention, a local oscillator is connected to a mixing circuit which utilizes a non-linear element such as a diode for the mixing element. An idling circuit is connected across the mixing element to effectively increase the frequency of the local oscillator to a value which provides a usable value of intermediate frequency (IF) signal.

It is therefore an object of the present invention to provide a high-frequency harmonic mixer.

It is another object of the present invention to provide a harmonic mixer which utilizes idling circuits.

These and other objects of the present invention will become more apparent when taken in conjunction with the following description and drawings in which.

Figures 1, 2, 3:
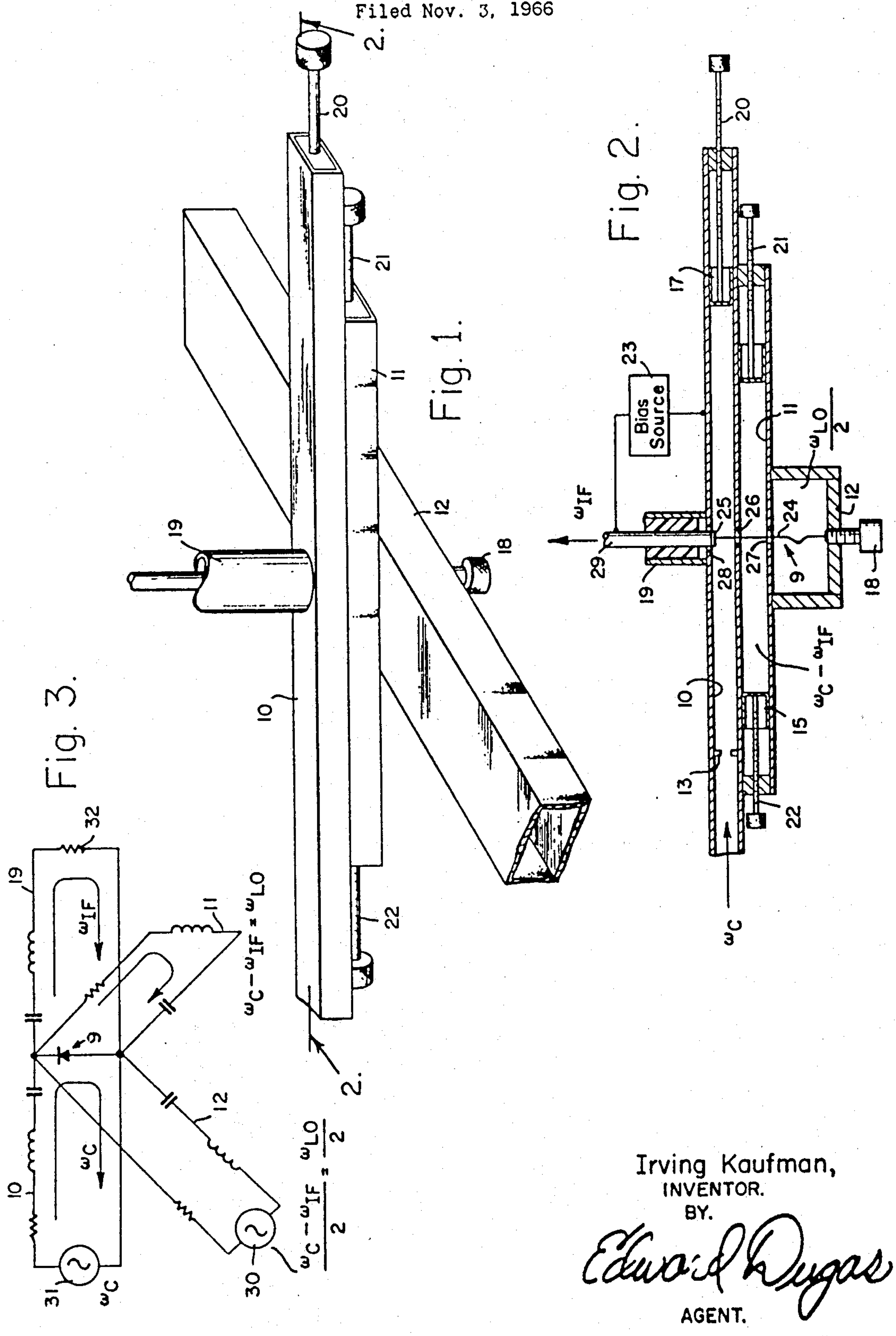
FIGURE 1 illustrates the preferred embodiment of the invention.
FIGURE 2 is a sectional view of the embodiment of FIGURE 1, taken along the sectioning lines 2—2.
FIGURE 3 is a schematic equivalent of the embodiment of FIGURE 1.

Referring to FIGURES 1 and 2, a high-frequency input signal $\omega_C$ is fed into waveguide 10 from a source not shown. A local oscillator frequency source (not shown) provides a signal of frequency $\omega_{LO/2}$ to waveguide 12.

Resonant cavity 11, tunable by adjusting members 15 and 16, operable by screws 22 and 21, respectively, is tuned to resonate at $\omega_{LO}$. Cavity 11 performs the function of an "idling circuit" effectively increasing the frequency of the signal from waveguide 12 by means of harmonic generation. The intermediate frequency $\omega_{IF}$, which may be either the sum or difference frequency between $\omega_C$ and $\omega_{LO}$, is taken from waveguide 10 by means of the coaxial cable 19. The non-linear element 9 is shown as being comprised of a tungsten whisker 24 touching a chip of boron-doped silicon 25. The pressure at which the whisker 24 touches the chip 25 may be adjusted by means of adjusting screw 18, which is mounted through the wall of waveguide 12. The whisker 24 extends through waveguide 12, opening 27, cavity 11, opening 26 and into waveguide 10, contacting chip 25. Chip 25 is electrically connected to conductor 29 which is the central conductor of coaxial cable 19. Opening 28 provides a passage for conductor 29 through the wall of waveguide 10. The opening 28 and conductor 29 form a high capacity, low impedance path for microwave currents.

The non-linear element 9 is biased into conduction by means of bias source 23.

The adjustable conducting member 17 is mounted into one end of waveguide 10 to tune the waveguide to the input frequency $\omega_C$. The amount of insertion of member 17 into waveguide 10 can be controlled by adjusting screw 20 from outside the waveguide.

Iris 13 increases the Q of waveguide 10 by preventing the escape of resonant or circulating energy in the area of the non-linear element 9.

In FIGURE 3, the input signal source 31 provides a signal of frequency $\omega_C$ to the waveguide 10, which is depicted in schematic circuit form. The local oscillator signal $\omega_{LO/2}$, which is equal to $$\frac{\omega_C - \omega_{IF}}{2}$$

is generated by the local oscillator 30 and fed to waveguide 12. The idler cavity 11 is tuned to the desired local oscillator frequency $\omega_{LO}$, which is equal to $\omega_C - \omega_{IF}$. Waveguides 10 and 12, along with idler cavity 11, feed their energy to the non-linear element 9.

The resonant circuit 19, which may be a coaxial cable, is tuned to the output intermediate frequency $\omega_{IF}$. A standard IF amplifier, simulated by the load resistance 32, may be connected to the coaxial cable 19 to receive and amplify and detect the IF-signal for further use in some utilization device such as a speaker.

In operation, the frequency from waveguide 12, $\omega_{LO/2}$, is not high enough to provide a useful intermediate frequency $\omega_{IF}$, but it contains harmonic frequencies, one of which ($\omega_{LO}$, for example) is high enough to provide a useful intermediate frequency signal. The amplitude of this harmonic signal will be low because of the relatively high impedance paths available to the harmonic signals.

The idling circuit 11 provides a highly efficient low impedance path for the harmonic frequency $\omega_{LO}$, where:

$$\omega_{LO} = \omega_C - \omega_{IF}$$

the frequencies $\omega_C$, $\omega_{LO/2}$ and $\omega_{LO}$ are mixed in the non-linear element in a heterodyning action to provide the desired difference frequency $\omega_{IF}$. A plurality of idling circuits may be used to generate $\omega_{LO}$ by their multiple interaction.

While there has been shown what is considered to be the preferred embodiment of the invention, it will be manifest that many changes and modifications may be made therein without departing from the essential spirit of the invention. For example, the embodiment shown is directed towards high frequency apparatus.

It will be obvious to persons skilled in the art that the invention may be used at lower frequencies by substituting standard circuit components for the waveguide and coaxial cable. It is intended, therefore, in the annexed claims, to cover all such changes and modifications as fall within the true scope of the invention.

What is claimed is:

1. A microwave harmonic generator and mixer comprising:
   (a) a resonant chamber tuned solely to a desired local oscillator frequency;
   (b) first input circuit means tuned solely to an input signal having an input frequency and coupled to said resonant chamber, said input frequency being larger than said oscillator frequency;
   (c) second input circuit means tuned solely to one-half of said local oscillator frequency and coupled to said resonant chamber;
   (d) an element having a nonlinear reactance coupled between said resonant chamber and said first and second input circuit means, whereby a local oscillator wave at one-half of said local oscillator frequency is doubled and then heterodyned with said input signal to derive an intermediate frequency signal; and
   (e) output circuit means coupled to said resonant chamber and to said first input circuit means and tuned to said intermediate frequency for deriving an output wave.

2. A harmonic generator and mixer as defined in claim 1 wherein said element is a semiconductor diode.

3. A harmonic generator and mixer as defined in claim 1 wherein said first input circuit means is a first waveguide, said second input circuit means is a second waveguide, and said resonant chamber is a third waveguide, said waveguides being disposed adjacent to each other, and each pair of waveguides having a common wall.

4. A microwave harmonic generator and mixer comprising:
   (a) a first input waveguide tuned solely to the input frequency of an input signal;
   (b) a second input waveguide tuned solely to a wave having one-half the frequency of a desired local oscillator wave;
   (c) a third resonant waveguide tuned solely to said local oscillator frequency and disposed adjacent said first and second waveguides, said local oscillator frequency being less than said input frequency;
   (d) a semiconductor diode coupled between said first, second and third waveguides whereby a wave at said local oscillator frequency is generated in said resonant waveguide and whereby said local oscillator frequency is heterodyned with said signal input frequency; and
   (e) output circuit means tuned to the difference between said input frequency and said local oscillator frequency to derive an output wave.

References Cited

UNITED STATES PATENTS

| | | | |
|---|---|---|---|
| 2,806,138 | 9/1957 | Hopper | 321—69 |
| 2,970,275 | 1/1961 | Kurzrok | 330—5 |
| 3,076,941 | 2/1963 | Yariv | 330—4.9 |
| 3,078,419 | 2/1963 | Damon | 321—69 X |
| 3,165,690 | 1/1965 | Kaufman | 321—69 |
| 3,025,448 | 3/1962 | Muchmore | 321—69 |
| 3,207,991 | 9/1965 | Sterzer | 325—449 |

JOHN F. COUCH, *Primary Examiner.*

G. GOLDBERG, *Assistant Examiner.*

U.S. Cl. X.R.

325—153, 449